United States Patent
De Villele

(12)
(10) Patent No.: US 6,336,766 B1
(45) Date of Patent: Jan. 8, 2002

(54) FIXING DEVICE FOR QUICKLY FASTENING AND RELEASING A MECHANICAL PART THAT BEARS ON A SUPPORT BASE

(75) Inventor: Damien De Villele, La Ferte Bernard (FR)

(73) Assignee: SERAC Group, La Ferte Bernard (FR)

(*) Notice: Subject to any disclaimer, the term of this patent is extended or adjusted under 35 U.S.C. 154(b) by 0 days.

(21) Appl. No.: 09/466,842

(22) Filed: Dec. 20, 1999

(30) Foreign Application Priority Data

Dec. 22, 1998 (FR) .............................. 98 16238

(51) Int. Cl.⁷ .................................................. F16B 7/18
(52) U.S. Cl. ........................ 403/348; 403/13; 403/349; 411/551
(58) Field of Search ................................. 411/551, 550; 403/13, 14, 337, 348, 349, 20, 21

(56) References Cited

U.S. PATENT DOCUMENTS

| | | | |
|---|---|---|---|
| 3,884,587 A | * | 5/1975 | Caldwell .................... 403/14 |
| 4,362,413 A | | 12/1982 | Heard et al. |
| 4,887,929 A | * | 12/1989 | Hale ....................... 403/14 X |
| 5,915,482 A | * | 6/1999 | Caruthers ............... 403/348 X |

FOREIGN PATENT DOCUMENTS

| | | |
|---|---|---|
| DE | 9417856 | 12/1995 |
| FR | 2599064 | 11/1987 |

* cited by examiner

*Primary Examiner*—Lynne H. Browne
*Assistant Examiner*—John R. Cottingham

(57) ABSTRACT

The invention relates to a fixing device for quickly fastening and releasing a mechanical part that bears on a support base, the device comprising a latching mechanism of the bayonet type and an associated clamping mechanism of the screw-and-nut type that is organized coaxially therewith, the mechanisms being actuated one after the other by actuating a common rotary drive member in the same direction, and the device having a temporary coupling means interposed between that member and the mechanisms so that over a first angle of rotation of the drive member said drive member actuates the latching mechanism, and then over a second angle of rotation, said drive member is uncoupled from the latching mechanism and actuates the clamping mechanism.

10 Claims, 9 Drawing Sheets

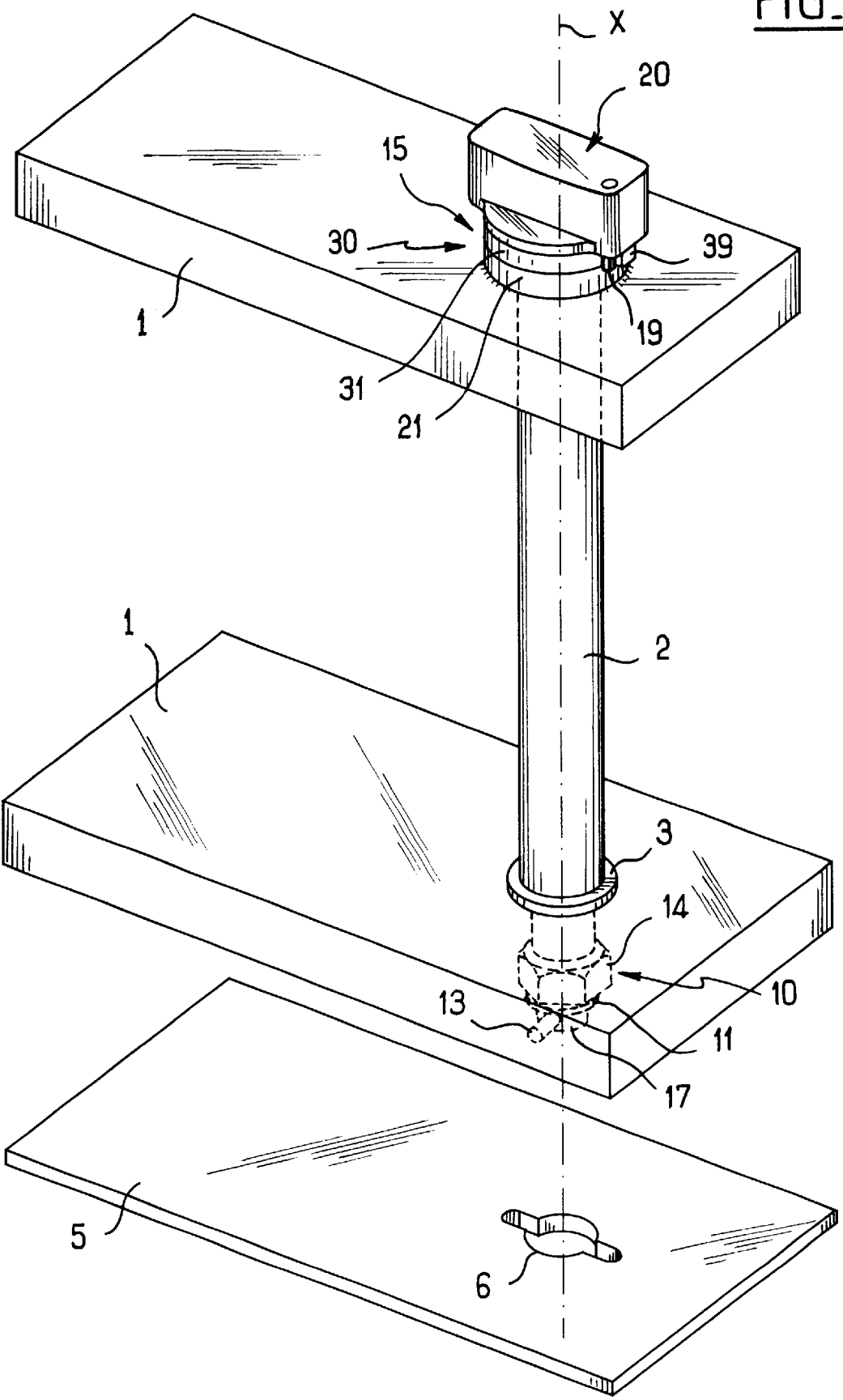

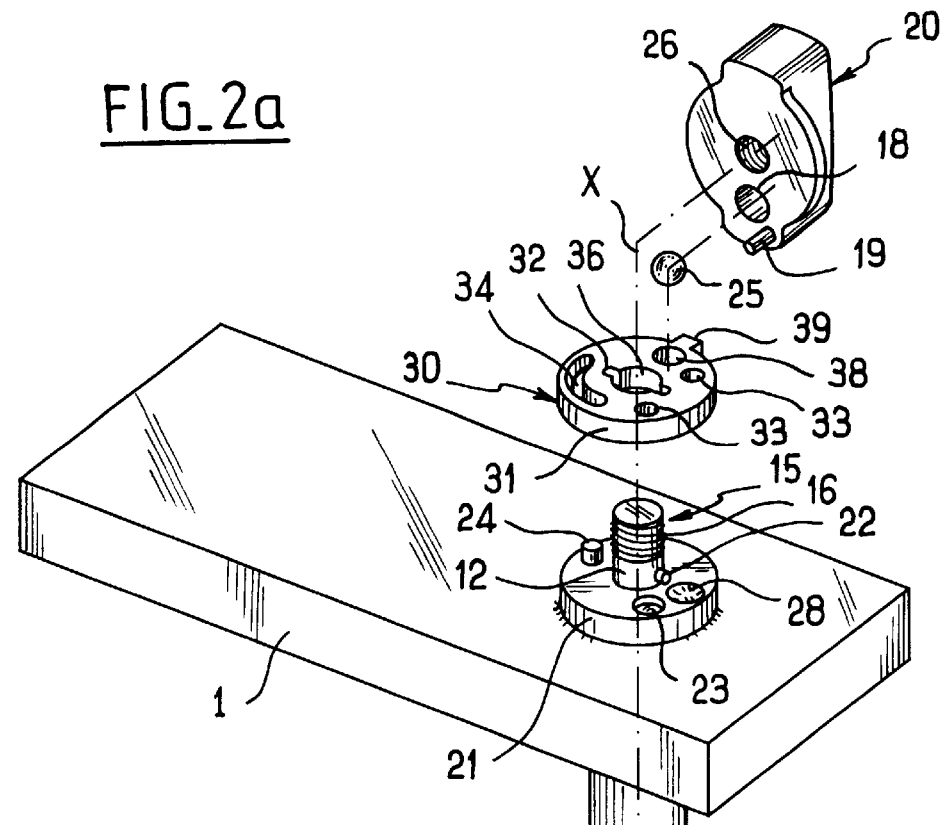
FIG_2a

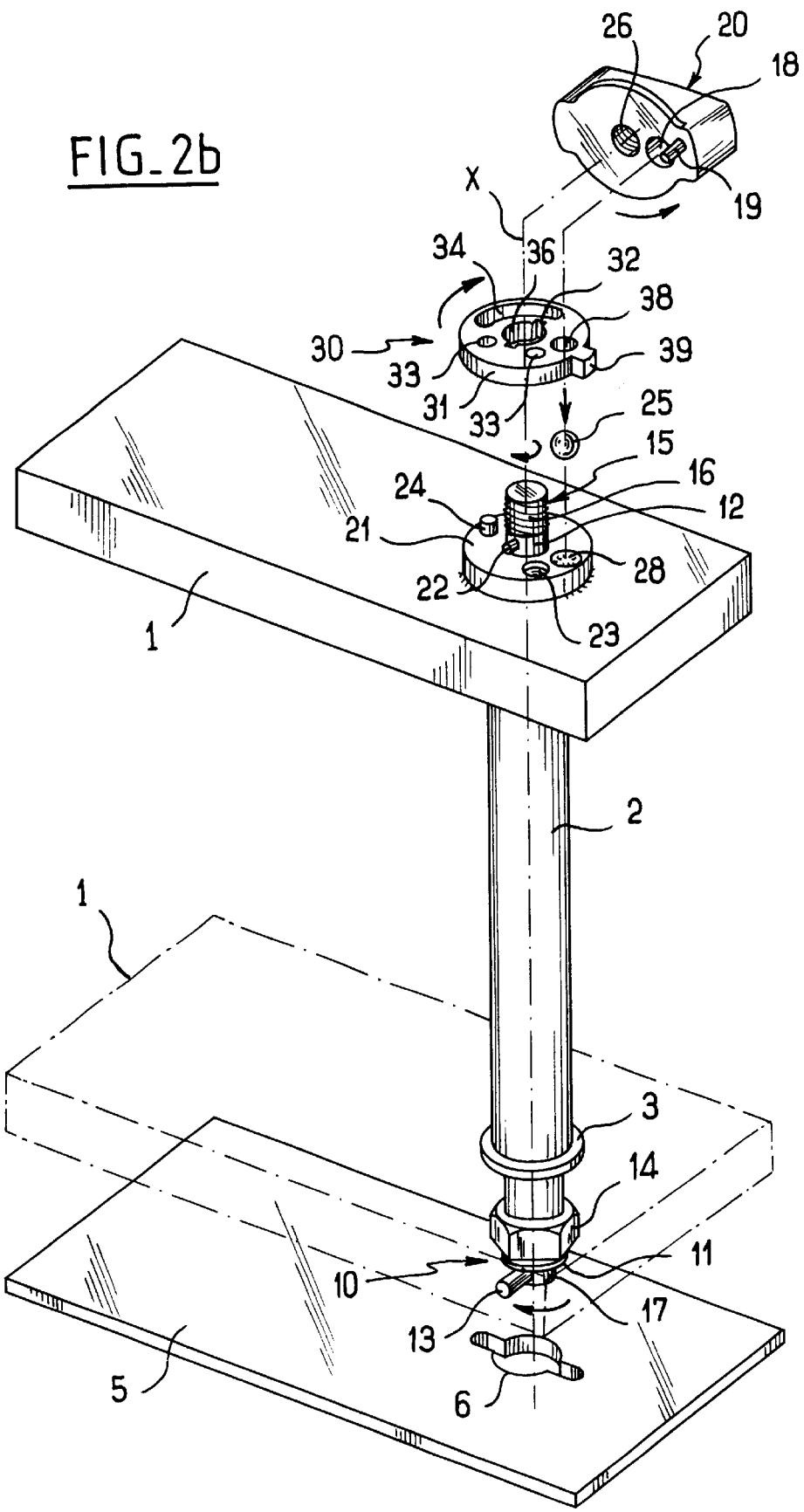
FIG_2b

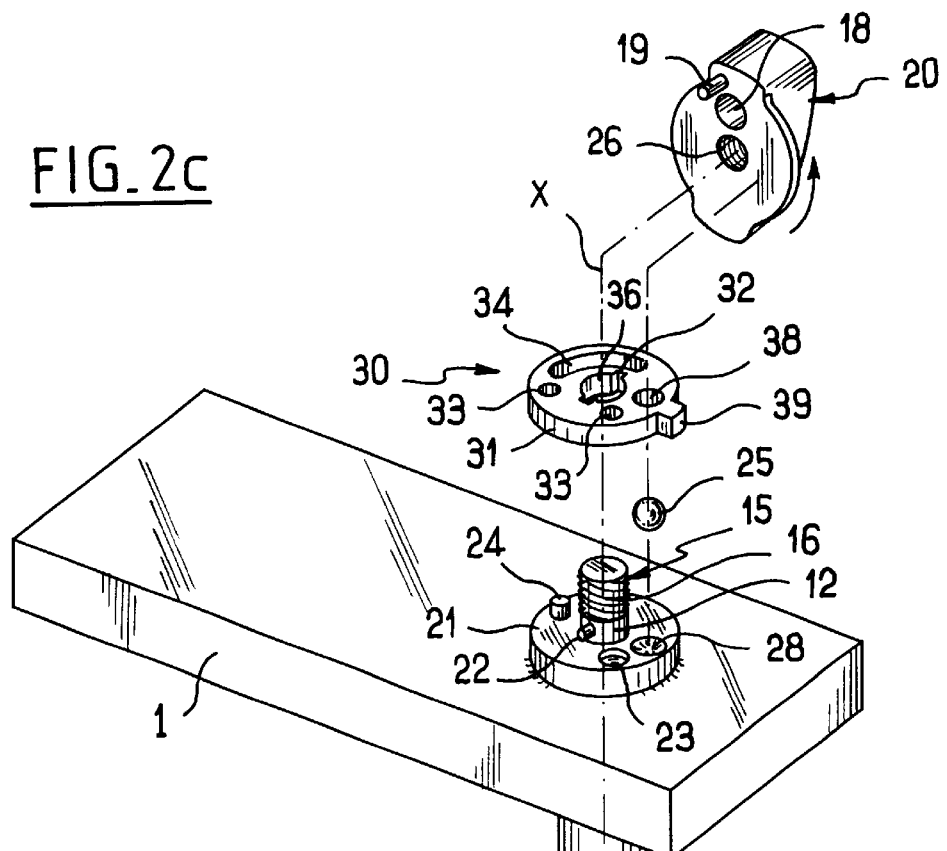
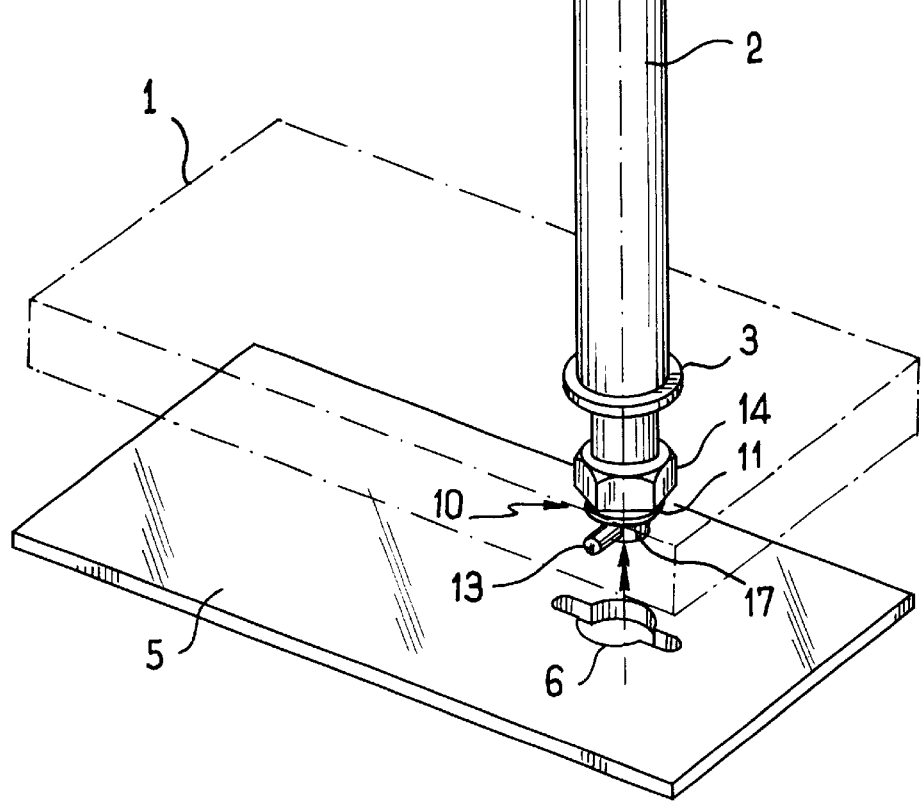
FIG_2c

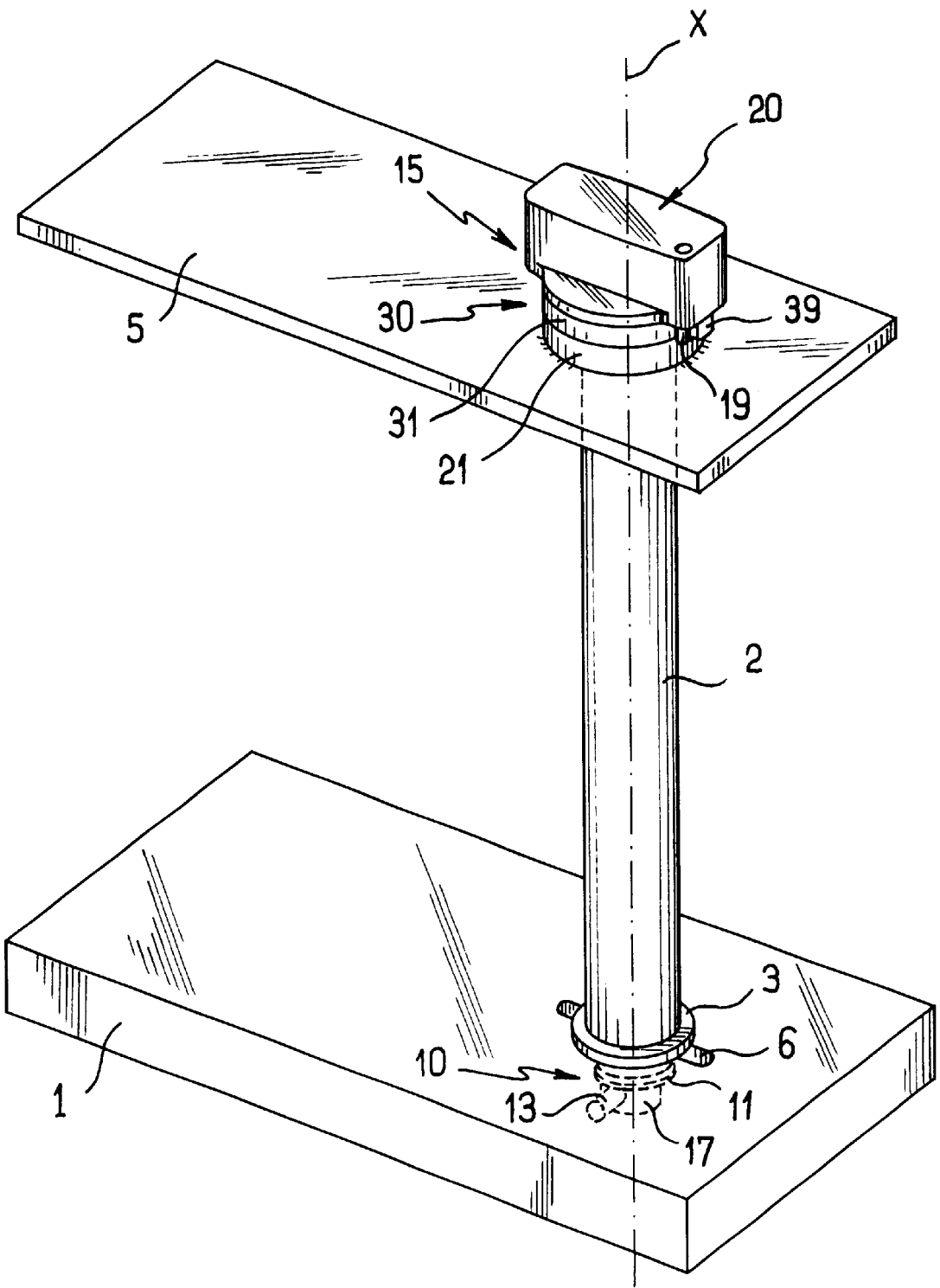
FIG_3

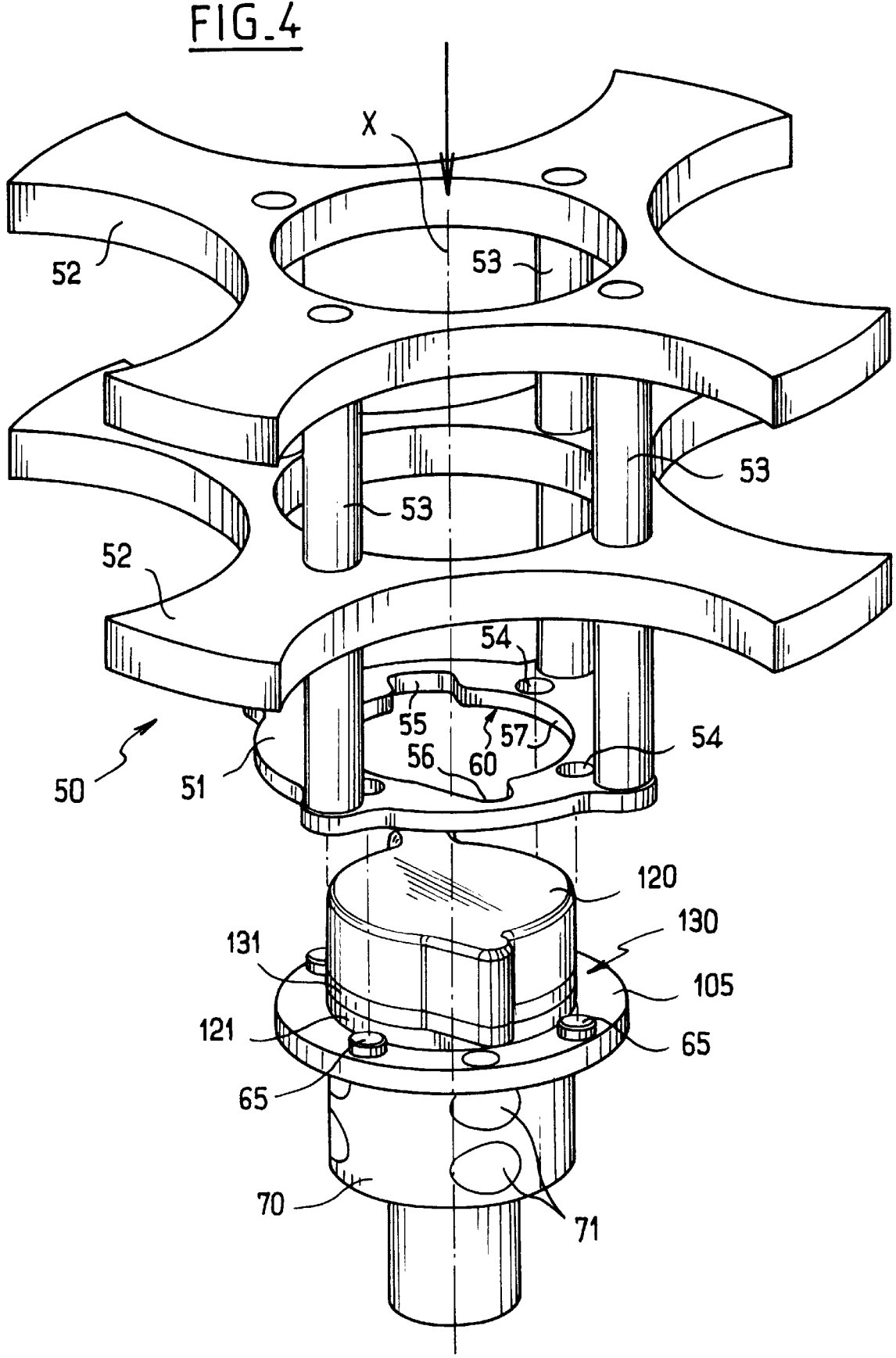

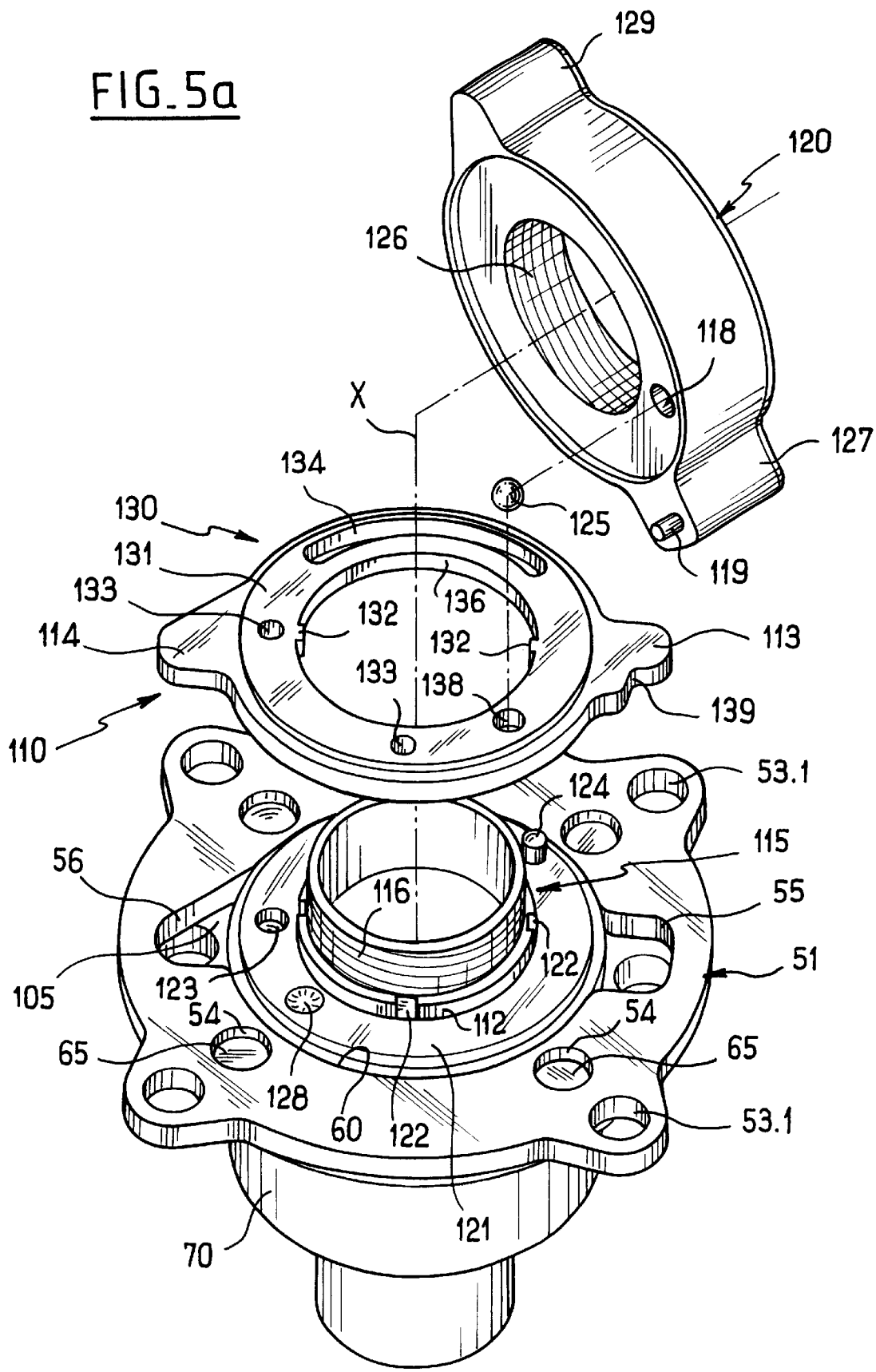

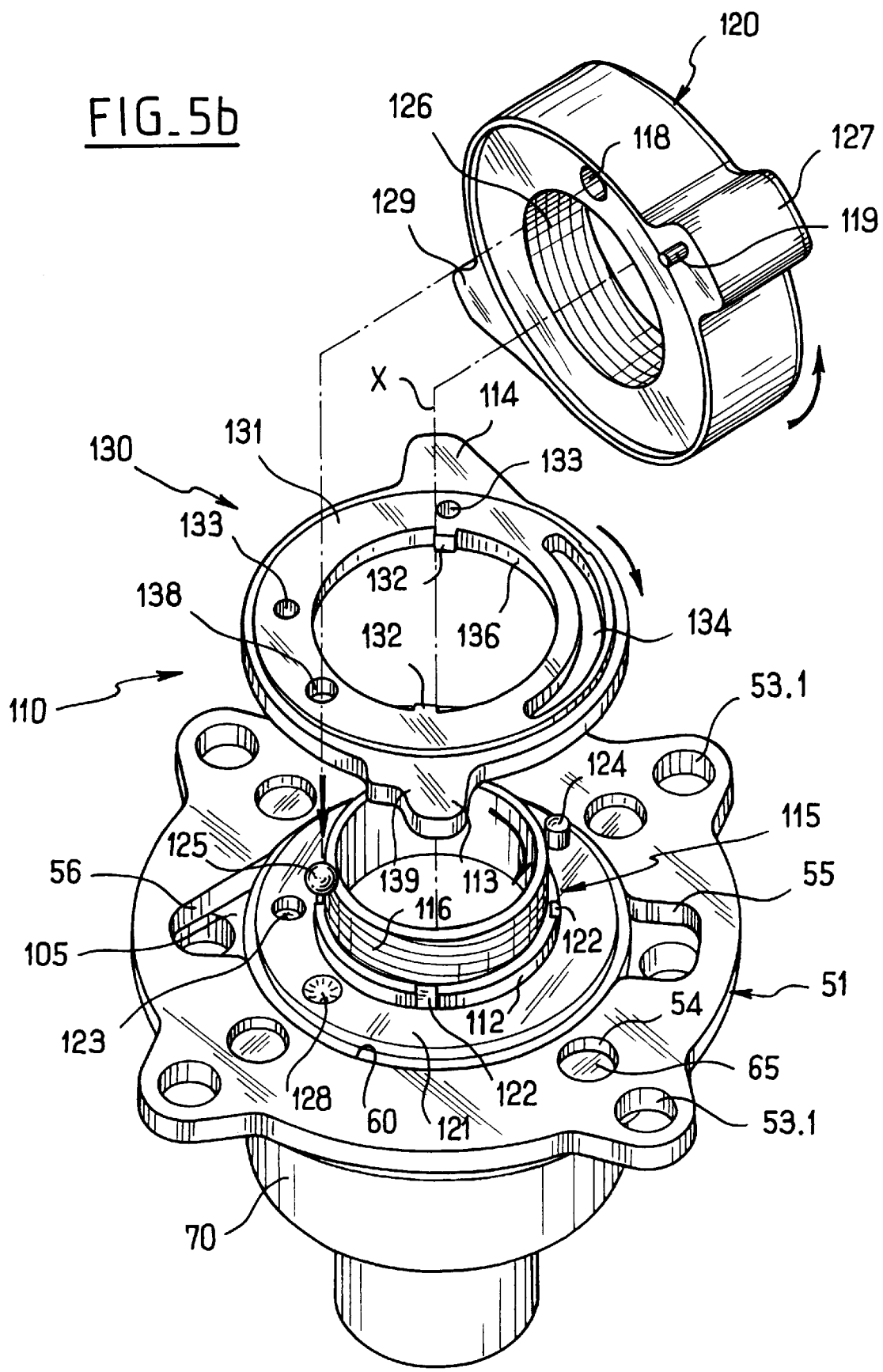

FIG. 6a
FIG. 6b
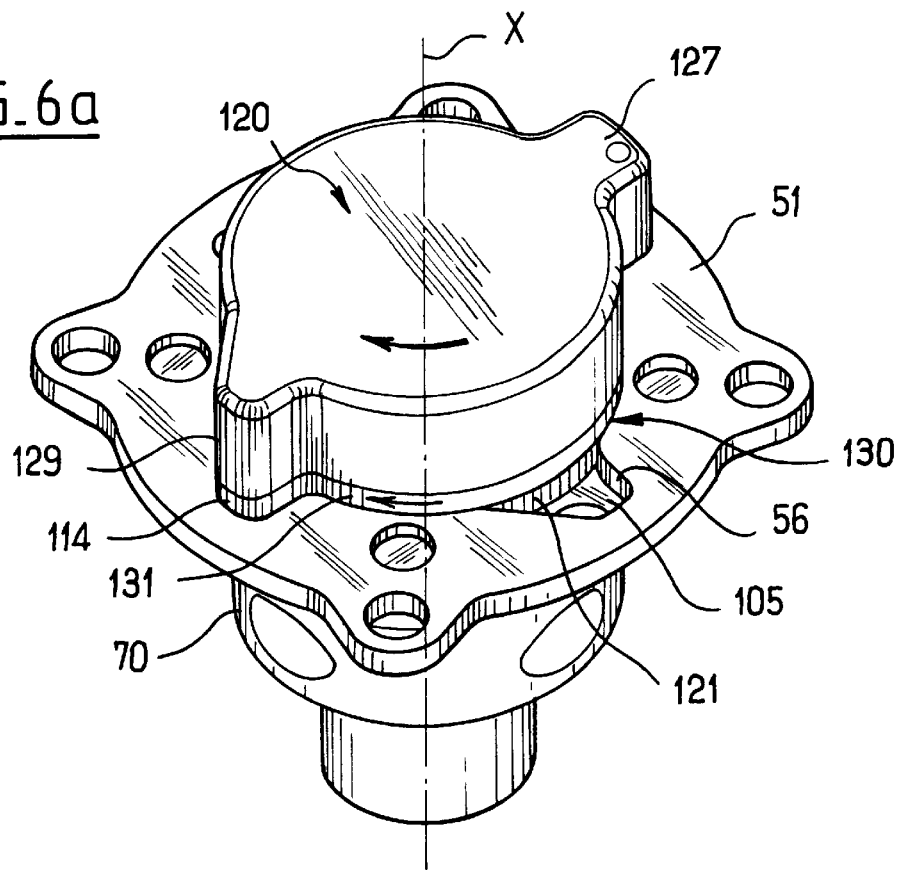
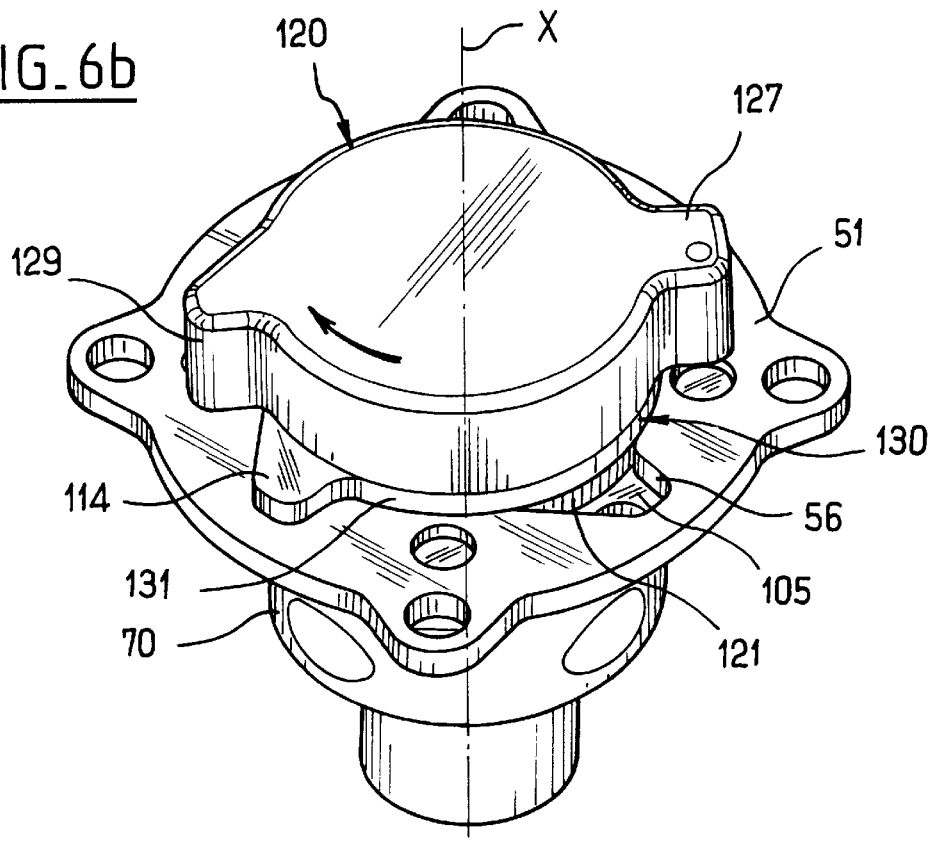

FIXING DEVICE FOR QUICKLY FASTENING AND RELEASING A MECHANICAL PART THAT BEARS ON A SUPPORT BASE

The present invention relates to a fixing device for quickly fastening and releasing a mechanical part that bears on a support base.

BACKGROUND OF THE INVENTION

Although the invention is not limited to any specific type of mechanical part for fixing to its support base, it relates more particularly to fixing tooling on an associated support base, which tooling needs to be put into place quickly and accurately on the support base, and then fixed thereto in reliable manner. Reference can be made in particular to the tooling fitted to packaging installations, in particular installations for filling or stoppering receptacles. The tooling in such installations conventionally comprises guide bars in the form of curved flat section members associated with star wheels or cylinders having curved notches or recesses serving to drive receptacles so that they are displaced along the conveyor line of the packaging installation.

In existing installations, such tooling is fixed by releasable links of various types. Mention can be made of systems having a simple link of the screw-and-nut type, optionally associated with retractable flanges, or systems using an eccentric, or indeed toggle-type lever systems or other systems relying on elastic deformation.

Document U.S. 4,362,413 discloses a quick fastening device comprising a clamping mechanism of the screw-and-nut type in which the nut has studs co-operating with a facing female part to form a bayonet latching mechanism. The assembly formed in that way is driven via the head of the screw. After the nut has been engaged in the female part, the head of the screw is rotated in the tightening direction, initially entraining the nut so that it rotates until the studs come into abutment. Continued rotation of the head of the screw then gives rise to clamping by the screw being tightened in the nut.

That sequence of movements of the device relies exclusively on the relative values of the resistive forces acting on the screw-and-nut, and also on the female part and the studs, such that if the nut is not properly engaged in the female part, rotating the head of the screw can give rise to tightening even though latching has not been performed properly. In addition, when untightening it is not possible to guarantee that the bayonet mechanism is caused to rotate. That device is therefore designed for providing fastening on a single occasion only.

OBJECTS AND SUMMARY OF THE INVENTION

An object of the invention is to design a fixing device both for fastening and for releasing, and which is both quick and reliable concerning latching and tightening during repeated fastening and release operations.

In addition, when the fixing device is for fitting to packaging installations or other installations concerned with foodstuffs, it is desired that the resulting fixing should be non-dirtying, i.e. free from any external portions presenting particles of pollution such as grease. Finally, to comply with the looked-for requirements of fastening and release operations taking place quickly, accessibility of the drive means and simplicity of the driving operations naturally constitute an object that is particularly desired for the preferred embodiment of the invention.

According to the invention, this problem is resolved by a fixing device for quickly fastening and releasing a mechanical part that bears on a support base, said device comprising a latching mechanism of the bayonet type and an associated clamping mechanism of the screw-and-nut type organized coaxially with said latching mechanism, the two mechanisms being actuated one after the other by actuating a common rotary drive member in the same direction, the device further comprising temporary coupling means interposed between the control member and the latching and clamping mechanisms, and organized in such a manner that over a first angle of rotation of the drive member said drive member is constrained to rotate with the latching mechanism, and that over a second angle of rotation of the drive member, said drive member is released from the latching mechanism and actuates the clamping mechanism.

The temporary coupling means thus ensures that the latching mechanism and the clamping mechanism are implemented in such a manner that those two functions can be performed in the proper order, both during fastening and during release, merely by reversing the control applied to the drive member.

In a particularly advantageous embodiment, the temporary coupling means comprises firstly a ring constrained to rotate with the screw of the clamping mechanism organized between the drive member forming the nut of the clamping mechanism and a fixed head rigidly secured to the mechanical part to be fixed or to the support base, and secondly a coupling member passing in an associated through bore of the ring, said coupling member being partially received either in a blind bore of the drive member over the first angle of rotation of said drive member, or else in an associated blind bore of the fixed head over the second angle of rotation of the drive member. In particular, the coupling member may be constituted by a steel ball. It is then advantageous to provide for the ring and the fixed head to carry complementary abutment and/or indexing means serving to define the first angle of rotation of the drive member, preferably over a short angle of the quarter-turn type.

Also preferably, the ring and the drive member carry complementary means for rotary drive that act during unscrewing of said drive member. The release process can then take place in extremely simple manner without the need to use any kind of external tool.

It is also advantageous to provide for the ring to be constrained to rotate with the screw by indexed linking that allows relative movement along the direction of the axis of the screw.

When the fixing device is one in which the fixed head is rigidly secured to the mechanical part to be fixed, it is advantageous to provide for the latching mechanism to comprise a rod that is coaxial with and secured to the screw of the clamping mechanism, said rod having a free end with projecting portions passing through a matching cutout in the support plate.

In a variant, when the device is one in which the fixed head is rigidly secured to the support base, it is advantageous to provide for the latching mechanism to comprise a rod that is coaxial with and secured to the screw of the clamping mechanism, said rod having a free end with projecting portions that pass through a matching cutout in the mechanical part to be fixed.

In another advantageous variant of the fixing device, in which the fixed head is rigidly secured to the support base, provision is made for the ring of the temporary coupling means to present projecting peripheral portions for latching the mechanical part to be fixed which bears on the support base, and centered on said fixed head by means of a matching cutout in said part, said ring then forming a component of the latching mechanism.

In which case it is advantageous for the external profiles of the ring and of the drive member to be included within the profile of the cutout of the mechanical part to be fixed, thereby enabling said part to be put into place or extracted while it is in the corresponding angular position and without it being necessary to remove the drive member.

BRIEF DESCRIPTION OF THE DRAWINGS

Other characteristics and advantages of the invention will appear more clearly in the light of the following description and the accompanying drawings relating to a particular embodiment, in which:

FIG. 1 is an exploded perspective view of a fixing device of the invention, intended more particularly for fixing a mechanical part that bears on a support base, the part being constituted in this case by two superposed guide bars;

FIGS. 2a, 2b, and 2c are perspective views showing respectively the mechanical part being put into place on its support base, the bayonet type latching mechanism being actuated, and finally the associated screw-and-nut type clamping mechanism being actuated;

FIG. 3 shows a variant in which the fixing device does not form part of the mechanical piece as in the preceding embodiment, but is secured to the support base from which a mechanical piece is suspended, for example a guide track for receptacles in a packaging installation;

FIG. 4 is a perspective view and an exploded view showing a variant of the preceding fixing device in which the ring of the temporary coupling means constitutes a component of the latching mechanism, the position shown being the position in which the mechanical part is being put into place, the mechanical part being constituted in this case by tooling comprising two star wheels in an installation for packaging receptacles;

FIGS. 5a and 5b are exploded perspective views showing the FIG. 4 fixing device respectively in its position for putting the mechanical part in place and in its position for latching said part on its support after the bayonet type mechanism has been actuated; and FIGS. 6a and 6b are perspective views of the preceding fixing device, respectively at the end of the latching mechanism being actuated and at the end of the associated clamping mechanism being actuated.

MORE DETAILED DESCRIPTION

A first embodiment of the invention is described below with reference to FIGS. 1 to 2c.

The mechanical part to be fixed is a piece of tooling, in this case constituted by two superposed bars 1, e.g. forming a set of two curved guide bars of the kind used in packaging installations, in particular installations for filling or stoppering receptacles, so as to keep the receptacles traveling around an associated star wheel or cylinder. In this case, the bars 1 are spaced apart by a hollow link tube 2 along which there pass various members used for fixing this tooling to a support base referenced 5.

The fixing device comprises firstly a latching mechanism 10 with some of the components thereof being visible in FIG. 1. The bottom bar 1 is held between a nut 14 and a bearing collar 3 that is rigidly secured to the hollow tube 2. Beyond the nut 14, there can be seen the free end 17 of a central rod that passes along the inside of the hollow tube 2, the rod having projecting portions that are implemented in this case in the form of a transverse pin 13. The support base 5 is represented in this case as a simple plate with a cutout 6 of profile that is adapted either to enable the latching portion of the bayonet mechanism 10 to pass through, i.e. the bottom end 17 thereof together with the pin 13, or else after rotation thereof, to provide axial latching using the conventional technique of bayonet mechanisms. The support base 5 is then inserted between a washer 11 bearing against the nut 14 and the two arms of the pin 13.

There is also provided an associated clamping mechanism referenced 15 of the screw-and-nut type, which mechanism is organized coaxially about the same axis as the latching mechanism 10. The axis common to these mechanisms which corresponds to the axis of the hollow tube 2 is referenced X.

As explained in greater detail with reference to FIGS. 2a to 2c, the two mechanisms 10 and 15 are actuated one after the other by actuating a common rotary drive member referenced 20 in the same direction. This member constitutes the nut of the clamping mechanism 15 and, as can be seen in FIG. 1, it is associated with temporary coupling means 30 interposed between the mechanisms and the drive member and having a ring 31 which is constrained to rotate with the screw of the clamping mechanism 15. As explained below, the temporary coupling means 30 is organized in such a manner that over a first angle of rotation of the drive member 20, said drive member is constrained to rotate with the screw of the screw-and-nut type clamping mechanism 15 whose nut is constituted by the common drive member 20, thereby actuating the latching mechanism 10, while over a second angle of rotation of the drive member 20, said drive member is free to be tightened or loosened on the screw of the clamping mechanism 15, thereby actuating said clamping mechanism.

The structure and the operation of the temporary coupling means 30 will be better understood on referring to FIGS. 2a to 2c.

The top bar 1 carries a fixed head 21 which is rigidly secured thereto, said fixed head being in the form of a flat circular disk in this case. The top end of a rod 12, whose bottom end is the above-described end 17 carrying the latching pin 13, passes through the center of the fixed head 21. This top end is terminated by a threaded portion 16 which specifically constitutes the screw of the clamping mechanism 15 whose nut is constituted by the common drive member 20. The drive member 20 has a tapped central portion 26 enabling it to be screwed onto the threaded portion 16. The rod 12 surmounted by the threaded portion 16 can turn freely inside the hollow tube 2, thereby enabling the angular position of the latching pin 13 to be modified for the purpose of co-operating with the edges of the cutout 6. This rod 12 is also mounted in such a manner as to have a certain amount of freedom to move axially along the axis X, thereby enabling the already-latched link to be clamped by the screw-and-nut type mechanism 15 after the bayonet type latching mechanism 10 has been actuated.

The temporary coupling means 30 comprises a ring 31 which in this case is in the form of a flat circular disk that is preferably made of metal, and that is constrained to rotate with the screw 16 of the clamping mechanism 15. In this case, this is the result firstly of the rod 20 carrying a projecting pin 22 and secondly of corresponding notches 32 provided in the central bore 36 of the ring 31. A coupling member 25, implemented in this case in the form of a steel ball is received in an associated through bore 38 of the ring 31. This coupling member 25 is also partially received either in an associated blind bore (or recess) 18 of the drive member 20 over a first angle of rotation of said drive member, or else in an associated blind bore (or recess) 28 of the fixed head 21 over a second angle of rotation of the drive member 20.

While it is being put into place, as shown in FIG. 2a, and until the drive member 20 has reached the end of its first angle of rotation, the coupling member (ball) 25 rests on the top plane face of the fixed head 21 and thus provides coupling between the ring 31 and the drive member 20. This corresponds to actuating the latching mechanism 10 on its own. At the end of this first angle of rotation of the drive member 20 (position of FIG. 2b), the through bore 38 comes into register with the blind bore 28 of the fixed head 21, and the coupling ball 25 moves so as to be partially received in the blind bore 28, thus breaking the rotary link between the drive member 20 and the ring 31, and establishing coupling between said ring 31 and the fixed head 21. Continued turning of the common drive member 20, as illustrated in FIG. 2c, then corresponds to a clamping stage, with the components that provide bayonet latching then remaining entirely stationary in terms of rotation.

Thus, to fix the tooling on its support base 5, it suffices to rotate the common drive member 20 over a first angle of rotation, thereby actuating the bayonet type latching mechanism 20 (from its position shown in FIG. 2a to its position shown in FIG. 2b), and then to continue turning said common drive member 20 still in the same direction, so as to actuate the clamping mechanism, thereby locking the positive latching already achieved by the latching mechanism 10 (turning from the position shown in FIG. 2b to the position shown in FIG. 2c). Over the first angle of rotation, the drive member 20 is not screwed onto the threaded end 16 because of the temporary coupling performed by the ring 31, whereas over the second angle of rotation, the temporary coupling between the drive member 20 and the ring 31 is eliminated, and said ring 31 can no longer continue to turn about the axis X because it is in turn coupled by the same ball 25 to the fixed head 21. Over this second angle of rotation, the coupling member 20 bears against the top face of the ring 31, and screw engagement of said member has the effect of raising the components of the latching mechanism slightly, i.e. the rod 12 together with its pin 13, as represented by the arrow in FIG. 2c, thereby finishing off fixing the tooling to its support base.

It is also advantageous to provide abutment and/or indexing means in order to define the first angle of rotation of the drive member 20, which first angle can be constituted by a short angle of the quarter-turn type.

For this purpose, there can be seen complementary abutment means constituted by a projecting peg 24 carried by the fixed head 21 and by a circular slot 34 (quarter of a circle) provided in the ring 31. Naturally, these means could be inverted, with a peg being provided that projects downwards from the ring 31 and with a circular slot being machined in the fixed head 21. To mark the two end positions of said first angle of rotation of the ring 31 relative to the fixed head 21 with maximum accuracy, which is important specifically to enable the coupling ball 25 to move down properly without jamming when it comes into register with the blind bore 28, complementary indexing means are also provided which are constituted in this case by a spring-loaded ball 23 housed in the fixed head 21 and two bores or recesses 33 formed in the bottom face of the ring 31. As for the abutment means, it would naturally be possible to invert the above-described complementary indexing means.

When it is desired to release the part, it suffices to turn the drive member 20 in the opposite direction, firstly to loosen the previously-established clamped link. Over this angle of rotation, the clamping mechanism 15 acts on its own since the ring 31 remains constrained in rotation with the fixed head 21.

Thereafter, it is necessary to re-establish the coupling between the ring 31 and the drive member 20 so as to enable the latching mechanism 10 to be actuated.

To this end, provision is made firstly for the ring 31 and the drive member 20 to carry complementary rotary drive means that act during the unscrewing of said drive member. Specifically, these complementary means are constituted by a pin 19 carried by the drive member 20 and by a catch 39 projecting from the ring 31. At the end of unscrewing, the pin 19 comes into contact with the catch 39 so that continued rotation of the drive member 20 then causes the ring 31 to rotate. By having an appropriate shape for the blind bore 28 in the fixed head 21, which is preferably organized in the form of a depression that is conically shaped, for example, this continued rotation of the ring 31 causes the coupling bore 25 to rise progressively and leave the blind bore 28. Thus, continued rotation of the drive member 20 associated with rotation of the ring 31 can continue normally, thereby enabling the bayonet type latching mechanism 10 to be actuated, and consequently enabling the mechanical part which was bearing against the support base 5 to be released.

It will be understood that during fastening or release, the rod 12 of the bayonet type latching mechanism 10 moves a short distance axially along the axis X, with said movement being made possible specifically by the indexed linking between the ring 31 and the screw 16, achieved in this case by the pin 22 and the associated notches or fluting 32, which linking allows the screw 16 to move relative thereto along the axis X.

In the embodiment described above with reference to FIGS. 1 and 2a to 2c, the fixing device is mounted on the mechanical part that is to be fixed. Naturally, that organization could be inverted, and FIG. 3 shows one such possibility.

In FIG. 3, the support base 5 carries a single part 1 by means of a fixing device whose components are exactly identical to those of the device described above. Nevertheless, the fixed head 21 that forms a portion of the temporary coupling means 30 is now rigidly secured to the support base 5. Under such circumstances and as before, the latching mechanism 10 comprises a rod that is coaxial with and secured to the screw of the clamping mechanism 15, but said rod now has a free end 17 with projecting portions 13 that pass through an appropriately shaped cutout 6 which is provided in the mechanical part to be fixed 1. It would also be possible to turn the organization shown in FIG. 3 upside-down by providing a part to be fixed that bears on the top of a support base, with the common drive member then being disposed underneath the support base.

The above-described fixing device is particularly suitable for fixing in quick and reliable manner guide bars that are fitted to a packaging installation, in particular an installation for filling or stoppering receptacles. The fixing device of the invention can also be adapted to fixing other types of tooling, and in particular tooling that is mounted to rotate about a vertical axis. For packaging installations, the rotary tooling could be constituted, for example, by single or dual star wheels having curved peripheral notches.

An embodiment of the fixing device of the invention that is organized more particularly for implementing such a mode of fixing tooling is described below by way of example with reference to FIGS. 4 to 6b.

In FIG. 4, there can be seen tooling 50 constituted in this case by two superposed star wheels 52 on the axis X, which wheels are united by axial columns 53. At the bottom of the tooling, there can be seen a flat baseplate 51 having the four columns 53 mounted thereto via associated bores 53.1. The baseplate 51 has a central cutout 60 centered on the axis X with diametrically opposite notches 55 and 56 which are described in greater detail below. The tooling 50 can be installed via its baseplate 51 on a support base 105. This support base 105 in this case forms a portion of a rotary box 70 organized to rotate about the axis X (with drive being provided, for example, by a motor which is coupled thereto by claws acting via notches 71). On its bearing face, the support base 105 has indexing pegs 65 received in associated through bores 54 in the baseplate 51. Once the baseplate 51 is properly in place, fixing can be performed using a device analogous to the device described above. To avoid pointlessly encumbering the description, reference can be made to the detailed description above with corresponding parts being given the same references plus 100.

Thus, as can be seen more clearly in FIGS. 5a and 5b, it can be seen that the box 70 and the support base 105 are surmounted by a fixed head 121 of circular shape. The baseplate 51 of the tooling 50 bears against the support base 105 and is centered on the fixed head 121 by means of the circular portion 57 of the cutout 60 in the baseplate 51. On the top bearing face of the fixed head 21, there can be seen the peg 124 that forms a portion of the abutment means, the spring-loaded ball 123 forming a portion of the indexing means, and the blind bore in the form of a conically shaped depression 128 provided to couple with the ball 125. The central rod 112 is mounted to rotate in the box 70, and the rod is surmounted by a threaded portion 116.

As before, the common drive member 120 has a central thread 126, a blind bore 118 associated with the coupling ball 125, and a pin 119 for co-operating with a complementary catch 139 secured to the ring 131 of the temporary coupling means 130 during unscrewing.

As before, the ring 131 of the temporary coupling means 130 has a central opening 136 corresponding to the outside diameter of the rod 112, and the indexed linkage therewith is then provided by two diametrically opposite projections 132 which are received in notches 122. In the figures, it can be seen that there are four notches 122, thus making four different reference positions possible (compared with two for the embodiment described above). The ring 131 also has a through bore 138 associated with the coupling ball 125, and two bores or recesses 133 associated with the indexing ball 123 to mark the beginning and the end of the first angle of rotation of the drive member 120 corresponding to the latching mechanism being actuated on its own.

Unlike the above-described mechanism, it can be seen that the ring 131 of the temporary coupling means 130 has projecting peripheral portions 113 and 114 enabling the mechanical part 51 to be fixed that bears against the support base 105 to be latched so that the ring 131 then forms a component of the bayonet latching mechanism 110.

In the position of FIG. 5a, the coupling ball 125 causes the drive member 120 and the ring 131 to rotate together, such that rotating the drive member 120 causes a corresponding rotation of the ring 131, and thus of the projecting portions thereof 113 and 114.

It can be seen that the cutout 60 in the baseplate 51 has notches 55 and 56 which, when the tooling is put into place, fit over the projecting portions 113 and 114. Turning the rotary drive member 120 then causes these projecting portions 113 and 114 to pass over the top face of the baseplate 51, thereby achieving the desired positive latching by means of this novel bayonet type latching mechanism 110.

After being turned, in this case through a quarter of a turn, the position shown in FIG. 5b is reached, at the end of which the coupling ball 125 moves downwards to be received in part in the blind bore 128 of the fixed head 121. The end portion 116 is then locked against rotation, thereby enabling the member 120 to be actuated in a screw-tightening direction to provide the final clamping.

The two successive angles of rotation are particularly easy to see in FIGS. 6a and 6b:

in FIG. 6a, the position shown corresponds to the end of the angle of common rotation for the drive member 120 and the ring 131, over which angle the bayonet type latching mechanism 110 acts on its own; and FIG. 6b shows that continued rotation of the drive member 120 no longer causes the ring 131 to rotate since it is prevented from rotating relative to the fixed head 121, which corresponds to a clamping stage by actuating the screw-and-nut type clamping mechanism on its own. The clearance between the ring 131 and the baseplate 51 is then reduced to zero, and the device ends up maintaining a permanent force between the baseplate 51 and its supporting base, in general after less than half a turn.

To release the tooling, it suffices to turn the drive member 120 in the opposite direction, thereby initially actuating the screw mechanism 115, and then the bayonet latching mechanism 110.

It will also be observed that the outside profiles of the ring 131, and in particular the shapes of the central projecting peripheral portions 113 and 114 thereof and of the drive member 120, in particular the peripheral drive projections 127 and 129 thereof are all included within the profile of the cutout 60 in the baseplate 51. It is thus possible to put the baseplate 51 into place or to remove it in the corresponding angular position without it being necessary to remove the drive member 120. This means that the tooling can be put into place extremely quickly, that it will be accurately centered, and that it immediately takes up its reference position.

In all cases, the fixing device of the invention makes it possible to obtain fixing that is particularly reliable. Even if the operator does not apply tight clamping, the coupling ring 31 or 131 prevents the screw 16 or 116 from rotating when the mechanical part is fixed on its support base. This provides a very high degree of security (non-reversible clamping) preventing any accidental disconnection of the mechanical part, particularly when the assembly is subjected to vibration or receives accidental shocks.

It is thus possible to combine latching with clamping that leaves no clearance and is rigid, while nevertheless using a single control that can be operated quickly merely by being turned, while nevertheless leaving the option of a shape that occupies little space and that is non-dirtying.

The invention is not limited to the embodiments described above, but on the contrary covers any variant using equivalent means to reproduce the essential characteristics specified above.

In particular, provision can be made for the screw connection between the common drive member and the associated threaded portion to be held captive, e.g. by a lateral stud projecting from said threaded portion and received in an associated groove of the drive member.

In an embodiment of the kind shown in FIG. 4 et seq., it is also possible to provide additional ball pushers on the fixed head serving to lift the temporary coupling ring slightly at the beginning of turning.

Provision can also be made for a device in which the drive member does not form the nut of the clamping mechanism. In which case, the drive member can be permanently connected to the temporary coupling member, with the temporary coupling member being associated alternately with an element of the latching mechanism and with an element of the clamping mechanism.

What is claimed is:

1. A fixing device for quickly fastening and releasing a mechanical part that bears on a support base, said device comprising a bayonet latching mechanism and an associated screw-and-nut clamping mechanism organized coaxially with said latching mechanism, the two mechanisms being actuated one after the other by actuating a common rotary drive member in the same direction, wherein the device further comprises temporary coupling means interposed between the drive member and the latching and clamping mechanisms, and organized in such a manner that over a first angle of rotation of the drive member said drive member is constrained to rotate with the latching mechanism, and that over a second angle of rotation of the drive member, said drive member is released from the latching mechanism and is constrained to actuate the clamping mechanism.

2. The fixing device according to claim 1, wherein the temporary coupling means comprises firstly a ring constrained to rotate with a screw of the clamping mechanism organized between the drive member forming a nut of the clamping mechanism and a fixed head rigidly secured to the mechanical part to be fixed or to the support base, and secondly a coupling member passing in an associated through bore of the ring, said coupling member being partially received either in a blind bore of the drive member over the first angle of rotation of said drive member, or else in an associated blind bore of the fixed head over the second angle of rotation of the drive member.

3. The fixing device according to claim 2, wherein the coupling member is a steel ball.

4. The fixing device according to claim 2, wherein the ring and the fixed head carry complementary abutment or indexing means serving to define the first angle of rotation of the drive member.

5. The fixing device according to claim 2, wherein the ring and the drive member carry complementary means for rotary drive that act during unscrewing of said drive member.

6. The fixing device according to claim 2, wherein the ring is constrained to rotate with the screw by indexed linking that allows relative movement along the direction of the axis of the screw.

7. The fixing device according to claim 2, in which the fixed head is rigidly secured to the mechanical part to be fixed, wherein the latching mechanism comprises a rod that is coaxial with and secured to the screw of the clamping mechanism, said rod having a free end with projecting portions passing through a matching cutout in the support base.

8. The fixing device according to claim 2, in which the fixed head is rigidly secured to the support base, wherein the latching mechanism comprises a rod that is coaxial with and secured to the screw of the clamping mechanism, said rod having a free end with projecting portions that pass through a matching cutout in the mechanical part to be fixed.

9. The fixing device according to claim 2, in which the fixed head is rigidly secured to the support base, wherein the ring of the temporary coupling means presents projecting peripheral portions for latching the mechanical part to be fixed which bears on the support base, and centered on said fixed head by means of a matching cutout in said part, said ring then forming a component of the latching mechanism.

10. The fixing device according to claim 9, wherein the external profiles of the ring and of the drive member are included within the profile of the cutout of the mechanical part to be fixed, thereby enabling said part to be put into place or extracted while said part is in the corresponding angular position and without being necessary to remove the drive member.

* * * * *